United States Patent
Castelli

(10) Patent No.: US 7,620,690 B1
(45) Date of Patent: Nov. 17, 2009

(54) PRIVACY CONTROL SYSTEM FOR ELECTRONIC COMMUNICATION

(75) Inventor: Eric L. Castelli, St. Louis, MO (US)

(73) Assignee: Lashback, LLC, Millstadt, IL (US)

( * ) Notice: Subject to any disclaimer, the term of this patent is extended or adjusted under 35 U.S.C. 154(b) by 871 days.

(21) Appl. No.: 10/972,531

(22) Filed: Oct. 25, 2004

Related U.S. Application Data

(60) Provisional application No. 60/523,597, filed on Nov. 20, 2003, provisional application No. 60/536,488, filed on Jan. 14, 2004.

(51) Int. Cl.
G06F 15/16 (2006.01)
(52) U.S. Cl. ...................................... 709/206; 709/207
(58) Field of Classification Search ................ 709/204, 709/206, 207
See application file for complete search history.

(56) References Cited

U.S. PATENT DOCUMENTS

| | | | |
|---|---|---|---|
| 5,999,932 A | 12/1999 | Paul | |
| 6,023,723 A | 2/2000 | McCormick et al. | |
| 6,052,709 A | 4/2000 | Paul | |
| 6,092,101 A | 7/2000 | Birrell et al. | |
| 6,167,434 A * | 12/2000 | Pang | 709/206 |
| 6,249,805 B1 | 6/2001 | Fleming, III | |
| 6,266,692 B1 | 7/2001 | Greenstein | |
| 6,321,267 B1 | 11/2001 | Donaldson | |
| 6,324,569 B1 | 11/2001 | Ogilvie et al. | |
| 6,330,590 B1 | 12/2001 | Cotten | |
| 6,393,465 B2 | 5/2002 | Leeds | |
| 6,400,810 B1 | 6/2002 | Skladman et al. | |
| 6,421,709 B1 | 7/2002 | McCormick et al. | |
| 6,453,327 B1 | 9/2002 | Nielsen | |
| 6,484,197 B1 | 11/2002 | Donohue | |
| 6,487,586 B2 | 11/2002 | Ogilvie et al. | |
| 6,493,007 B1 * | 12/2002 | Pang | 715/835 |
| 6,546,416 B1 | 4/2003 | Kirsch | |
| 6,615,242 B1 | 9/2003 | Riemers | |
| 7,092,992 B1 * | 8/2006 | Yu | 709/206 |
| 2002/0016824 A1 | 2/2002 | Leeds | |
| 2002/0026487 A1 | 2/2002 | Ogilvie et al. | |
| 2002/0059385 A1 | 5/2002 | Lin | |
| 2002/0116463 A1 | 8/2002 | Hart | |
| 2002/0120748 A1 | 8/2002 | Schiavone et al. | |
| 2002/0129111 A1 | 9/2002 | Cooper | |
| 2002/0162025 A1 | 10/2002 | Sutton et al. | |
| 2002/0174185 A1 * | 11/2002 | Rawat et al. | 709/206 |
| 2002/0181703 A1 | 12/2002 | Logan et al. | |
| 2002/0198950 A1 | 12/2002 | Leeds | |
| 2003/0023692 A1 | 1/2003 | Moroo | |
| 2003/0041126 A1 | 2/2003 | Buford et al. | |
| 2003/0050988 A1 | 3/2003 | Kucherawy | |
| 2003/0088627 A1 | 5/2003 | Rothwell et al. | |
| 2003/0131063 A1 | 7/2003 | Breck | |

(Continued)

Primary Examiner—Jeffrey Pwu
Assistant Examiner—Gerald Smarth
(74) Attorney, Agent, or Firm—Dennis J. M. Donahue, III; Husch Blackwell Sanders LLP

(57) ABSTRACT

A privacy control system provides a centralized process for managing unsubscribe requests to unsolicited communications. The system receives reports of unsolicited communications, determines and follows the corresponding unsubscribe processes, and tracks the success of unsubscribe requests. The system can unsubscribe an individual or group of individuals through the centralized process, recording and monitoring the success of the request, independent of the email client used by the individuals.

6 Claims, 2 Drawing Sheets

U.S. PATENT DOCUMENTS

| | | |
|---|---|---|
| 2003/0132972 A1* | 7/2003 | Pang .......................... 345/835 |
| 2003/0149726 A1 | 8/2003 | Spear |
| 2003/0158777 A1* | 8/2003 | Schiff et al. ................... 705/14 |
| 2003/0158905 A1 | 8/2003 | Petry et al. |
| 2003/0163540 A1 | 8/2003 | Dorricott |
| 2003/0167311 A1 | 9/2003 | Kirsch |
| 2003/0172294 A1* | 9/2003 | Judge ......................... 713/200 |
| 2003/0187942 A1* | 10/2003 | Quine et al. ................ 709/207 |
| 2003/0191969 A1 | 10/2003 | Katsikas |
| 2003/0195933 A1 | 10/2003 | Curren et al. |
| 2003/0196116 A1 | 10/2003 | Troutman |
| 2006/0031303 A1* | 2/2006 | Pang .......................... 709/206 |

\* cited by examiner

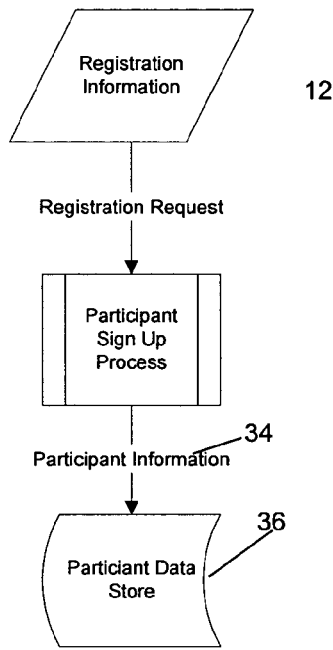
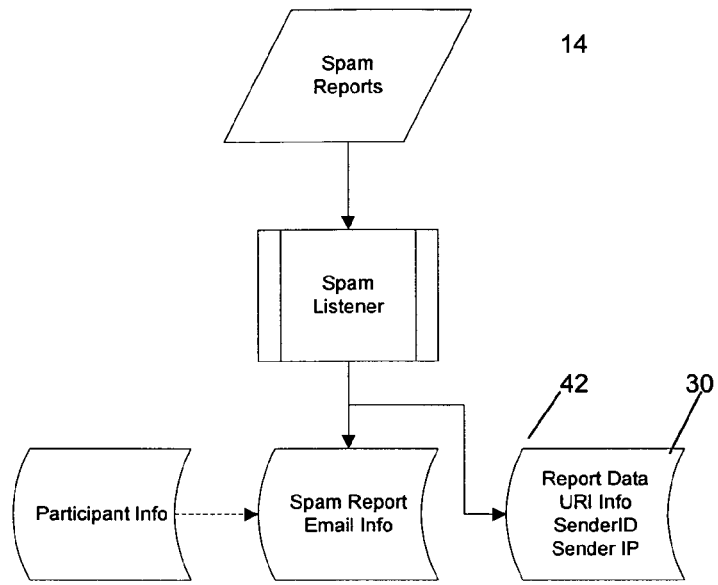
FIGURE 2
FIGURE 3
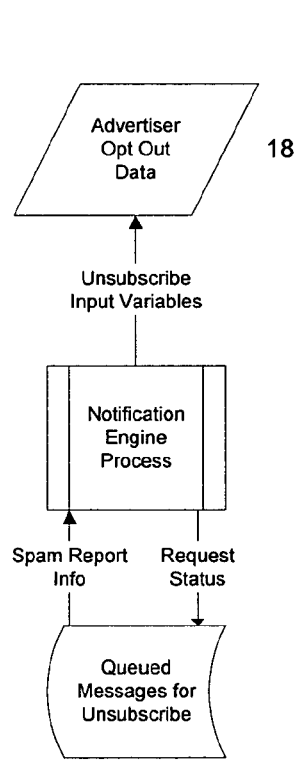
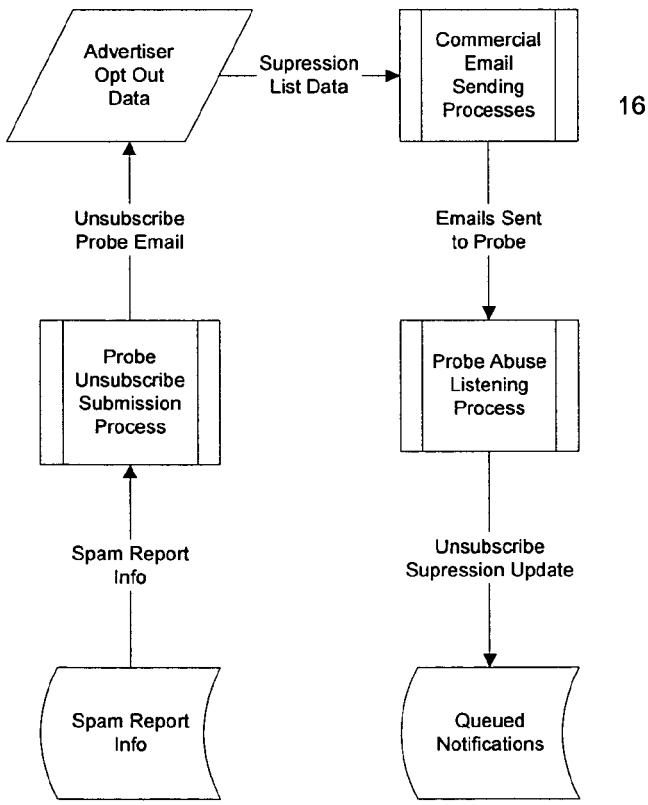
FIGURE 5
FIGURE 4

PRIVACY CONTROL SYSTEM FOR ELECTRONIC COMMUNICATION

CROSS-REFERENCE TO RELATED APPLICATIONS

This application claims the benefit of U.S. Provisional Application Ser. Nos. 60/523,597, filed Nov. 20, 2003 and 60/536,488, filed Jan. 14, 2004.

BACKGROUND OF THE INVENTION

1. Field of the Invention

This invention relates generally to privacy controls for electronic communication systems and, more particularly, systems and methods for posting unsubscribe requests from electronic communication through a centralized process and monitoring the success of this process.

2. Related Art

Spam has become an increasingly large problem on the Internet. On a daily basis, billions of unsolicited advertisements are received by millions of individuals. The low cost of email makes it a great mechanism for advertisers to reach a large audience of potential customers. Unfortunately, in many cases, unsolicited emails simply act as an annoyance to Internet users and do nothing but cause frustration and slow productivity. Due to the increasing volume of spam and user's frustration and annoyance, several different techniques to reduce spam volume have been attempted.

Spam filters are one of the most common mechanisms of reducing spam volume. However, the problem with spam filters is spammers easily figure out ways to trick the filters and get their mail through. While spam filters are constantly getting smarter, so too are spammers. In addition, spam filters often require configuration by ISPs, customers or network specialists which becomes too cumbersome for most individuals. Also, spam filters will often block legitimate email, creating additional problems for users.

Many states have laws which restrict how unsolicited advertisements can be delivered. Many of these laws simply enforce that spammers use a valid email address, email does not contain a misleading subject, and that email advertisers provide a means for allowing recipients to opt-out or otherwise unsubscribe. Unfortunately, these laws are difficult to enforce due to the lack of violation tracking mechanisms and the difficulty tracking down violators.

There are numerous bills proposed on the Federal level which propose tightening the ropes on what email advertisers can do. However, these attempts will likely face tough battles, as advertisers will lobby hard to prevent such measures, such as with the proposed Federal Do Not Call List. In addition, the Federal Government also has very little means to enforce such laws and would be limited in prohibiting spam from International parties.

Another mechanism for reducing spam requires a user to perform one of the many types of unsubscribe processes that spammers may use. Advertisers who provide an unsubscribe mechanism generally comply with unsubscribe requests. However, unscrupulous spammers may not comply with any request and will only stop after being ordered by a court. Additionally, even when the users follow the unsubscribe mechanisms, they usually have specific requirements that differ only slightly, but since the unsubscribe processes are usually automated, an error in following the particular requirements usually results in a failed unsubscribe request. Accordingly, a user may use the unsubscribe mechanism to avoid spam from a particular source but may continue to receive spam from this source.

Some have proposed offering programs that tie into the email client that provides the option of automatically deleting spam and unsubscribing from the source. However, a process that is dependant on the email client does not provide a universal solution for email users, since there are hundreds of email clients in use today and more will continue to develop as email evolves to new realms. In addition, it does not provide a centralized mechanism for determining advertisers and email senders that persistently fail to comply with requests to unsubscribe from electronic communication. Therefore, it would be beneficial to have a centralized system that can assist users with unsubscribing from electronic communication and monitor of unsubscribe requests by multiple users.

SUMMARY OF THE INVENTION

It is in view of the above problems and limitations in known privacy control systems that the present invention was developed. The present invention provides a centralized system that manages and tracks the unsubscribe requests for individuals or groups of individuals wishing to unsubscribe from future electronic solicitations that is independent of the email client that these individuals are using.

The present invention provides a single source for receiving spam reports and requests to unsubscribe from electronic communication and a process for automatically performing unsubscribe actions and monitoring the outcome. Accordingly, subscribers to the protection side of the system shall benefit from a reduction of unsolicited correspondence as well as other types of communication, if not a complete elimination without specific software requirements.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
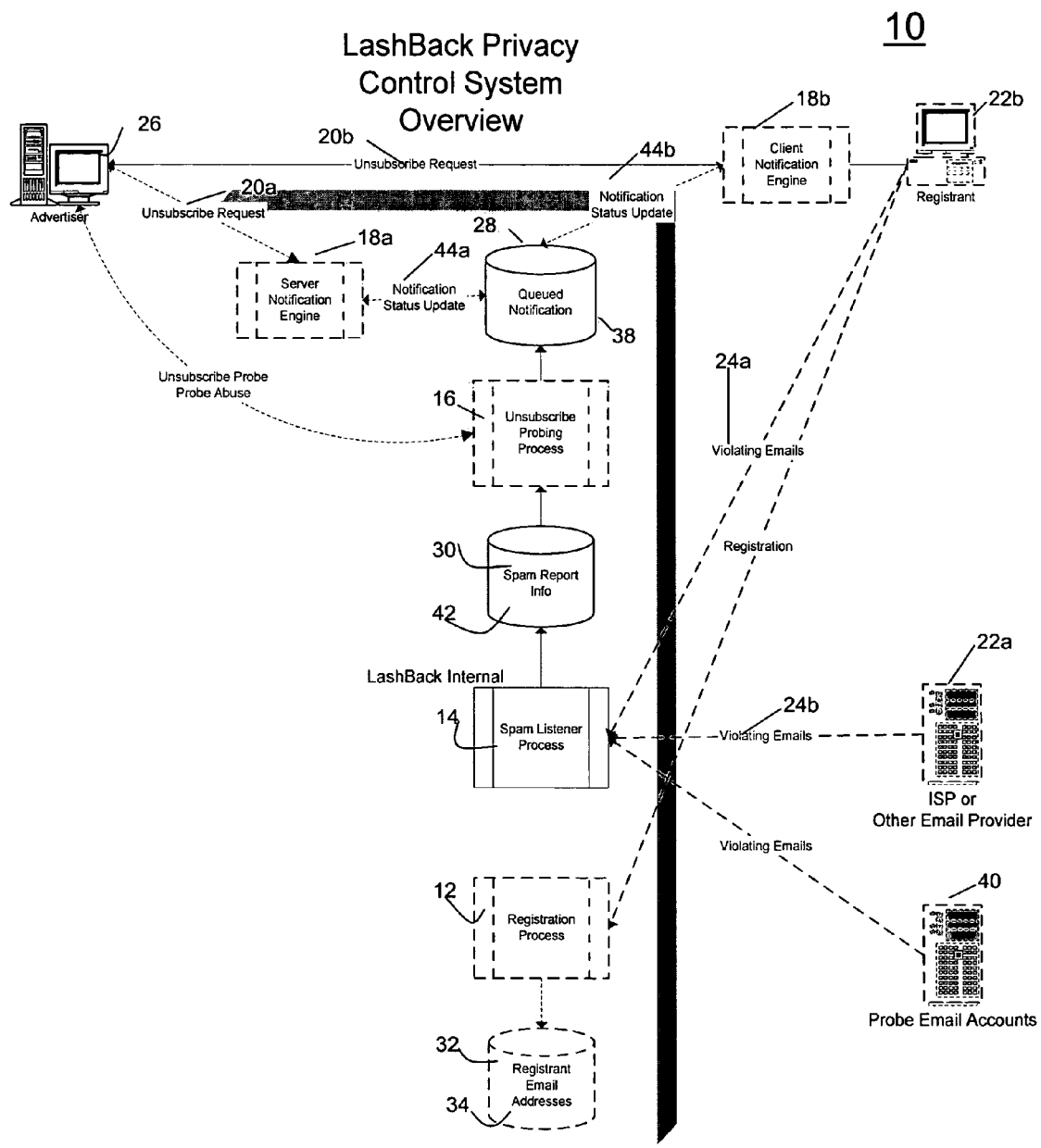
FIG. 1 illustrates a process overview of the privacy control system for electronic communication according to the present invention.
Figure 1:
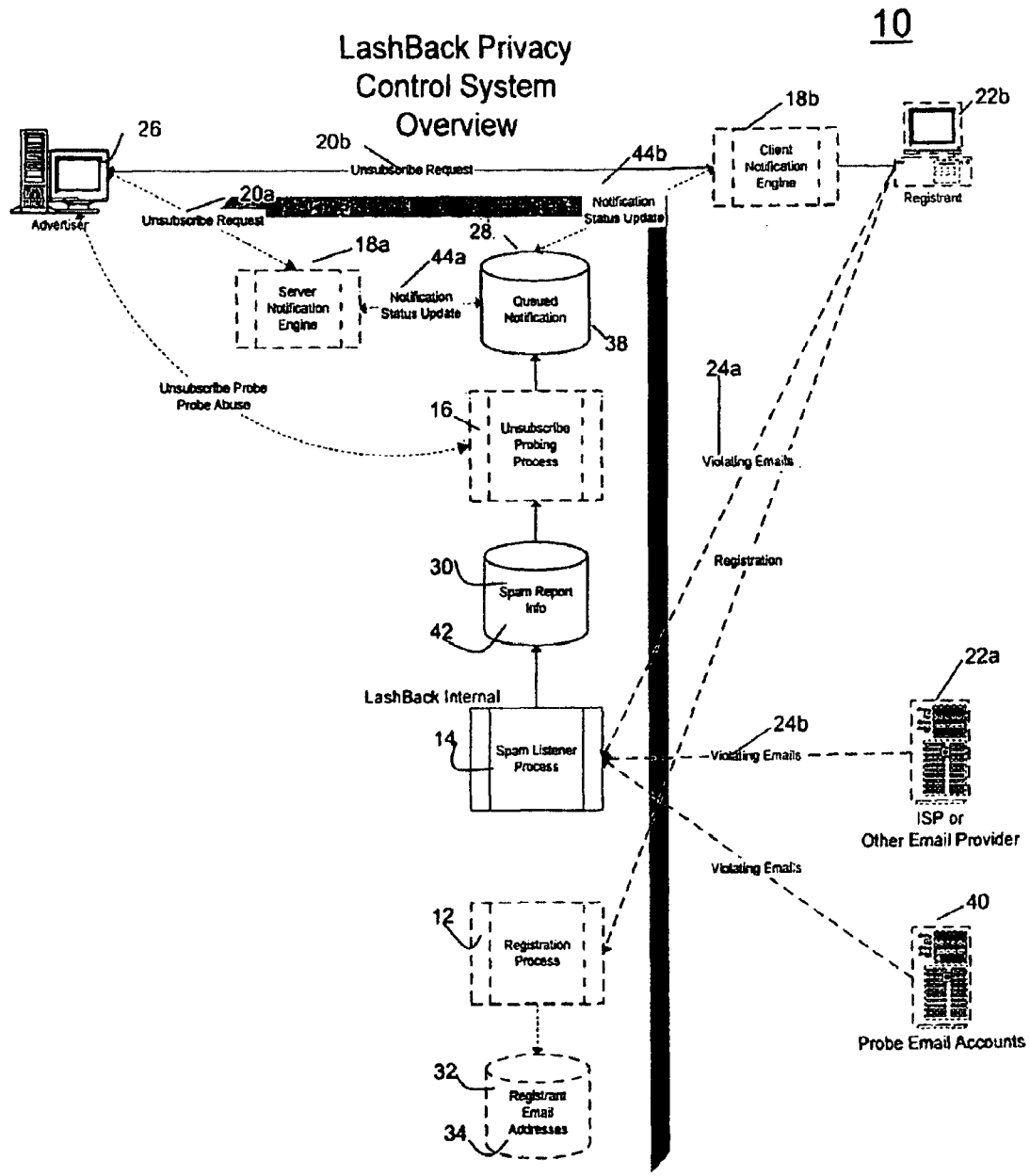

Referring to the accompanying drawings in which like reference numbers indicate like elements, FIG. 1 illustrates a privacy control system 10 for electronic communication. The privacy control system 10, known as LASHBACK™, preferably has four basic components: the participant registration process 12, the spam listener process 14, the unsubscribe probing process 16 and the notification engine process 18a, 18b. Brief descriptions of these processes are discussed below with reference to FIG. 1, followed by a detailed description of each module. Generally, the system 10 manages and tracks the unsubscribe requests 20a, 20b for participants 22a, 22b, who may or may not be registered, independent from the email clients that are being used by the participants. In particular, the privacy control system 10 receives spam notices 24a, 24b from the participants, identifies advertisers 26 from the spam notices 24a, 24b, determines unsubscribe mechanisms 28 corresponding with the advertisers 26, and sends the unsubscribe requests 20a, 20b to the advertisers 26 according to the unsubscribe mechanisms 28.

In the preferred embodiment, privacy control is provided in a centralized system 10 for processing the unsubscribe requests 20a, 20b from electronic communication and recording the status 44a, 44b of the requests. In this way, the centralized privacy control system 10 provides a single source for users of electronic communication to unsubscribe from future solicitation that does not require software to be installed on the client 22. In addition, it provides a mechanism for compiling spam report information 30 about which senders and advertisers comply and which ones fail to comply with these requests. This data can then be used in establishing a reputation for these senders and advertisers.

For participant registration 12, a web site allows participants to register. When a participant signs up to use the system, the participant provides basic information, including the email address or email addresses 32 for which unsubscribe requests are to be processed. A secure database records and stores participant information 34 as a subscriber set 36. Each subscriber is provided with a login account to allow them to change their information or disable participation from the service at a later point. In the preferred embodiment, the database stores the addresses of multiple subscribers as a subscriber set, and it will be appreciated that, under general set theory as used herein, the subscriber set may include a single subscriber.

It will also be appreciated that, although email addresses 32 are being stored in an address field for the preferred embodiment, the addresses could be any identification scheme for the subscribers, such as a postal address in a privacy control system for physical mail, a phone number or other user identification code for telephony, a device address (such as IRD, MAC, or subscriber ID) in a privacy control system for broadcast or multicast receivers, &/or any other equivalent schemes. Accordingly, as used herein, spam is a general reference to unsolicited bulk communications.

The spam listener 14 process allows participants to report spammer violations and queue an unsubscribe request 38 for that email. When a subscriber receives an unsolicited email, they simply forward the violation to a specified email address that receives the report for the spam listener. As discussed in detail below, a set of probe email addresses 40 may also be used to automatically forward reported spam to the spam listener 14. The spam listener records the alleged violations in a secure database 42 and tallies the alleged violations. Each email sent to the spam listener is parsed and violations can be tallied and reported in the spam reports 30 by any information in the reported email 24a, 24b, including the spammer's email address, email header information and URLs listed in the email, as well as IP addresses and related sender ID information contained within the message.

The unsubscribe probing process 16 can be employed on spam reports that come in to determine parties that abuse unsubscribe requests. Unsubscribe abuse is when an email address is posted to an unsubscribe mechanism and added to future mailing lists by the recipient of the request. Thus, rather than suppressing the email address from future email, more email is sent to the address. This process is able to probe each unsubscribe mechanism and determine which are abused, thereby suppressing unsubscribe requests for users from being made to these mechanisms.

The notification engine 18a, 18b is a program that takes the unique emails sent to the listener and parses the email in search of an opt-out mechanism 28. If an opt-out email address, form, or other mechanism is found in the violating email or on the web pages referenced in the email, then an opt-out request can be submitted for each user through the mechanism provided by the advertiser. A downloadable version on the notification engine 18b may be offered to subscribers or the notification engine 18a can run on the preferred centralized system 10 which may include one or more servers. If a subscriber 22b runs the notification engine from their PC, violators can be notified more quickly. Accordingly, the opt-out requests can be submitted by the central server, by the individual users' computers or by a combination of both the server and the computers. In all cases, the success 44 of the request can then be stored and recorded, providing the data that supports which advertisers and senders abide by unsubscribe requests and which fail to do so.

Figure 2:
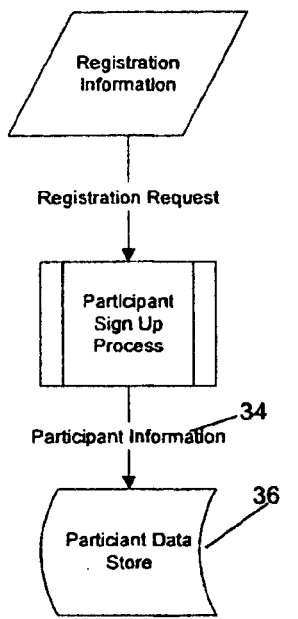
FIG. 2 illustrates a flow diagram of the registration process.

The optional participant registration process 12, as illustrated in FIG. 2, is preferably performed through a public web site. When an individual wants to sign up for the service, they go to the web site and enter their email address, a secure password and other participant information. Once the user submits the request, the participant's information is stored in a database and they are officially registered for the service.

Figure 3:
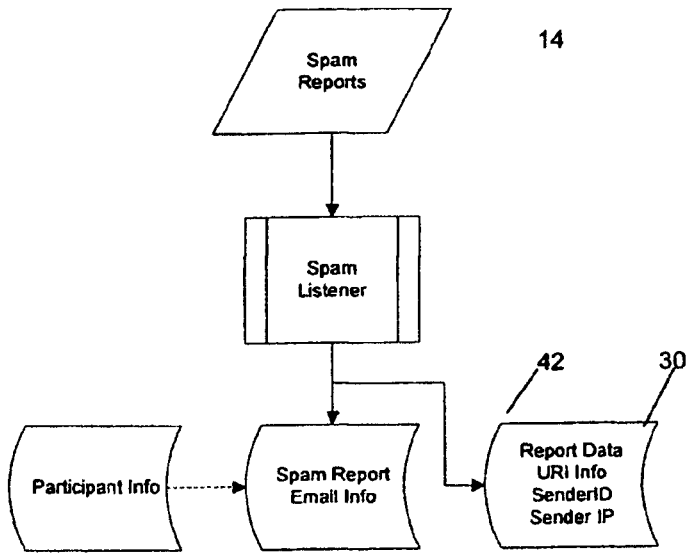
FIG. 3 illustrates a flow diagram of the spam listener process.

As illustrated in FIG. 3, the spam listener process 14 retrieves each reported spam message from this email address through POP3, MAPI or similar email retrieval process. The spam listener 14 parses the reported spam and compiles the information as a spam report 30. Participants preferably forward spam messages 24a or requests to unsubscribe to a designated email address, and the spam listener parses out the individual who reported the spam. If the individual who reported the spam is not a registered participant, the email addresses of the sender may be determined based on the headers of the email or other components of the request. The spam sender's email address and the email send date, as determined by the email headers, may be used to uniquely identify the spam report and the report is recorded in a database 42 and associated with the reporting email address.

Each Uniform Resource Indicator (URI) for each hyperlink in the reported message is determined, logged and associated with the spam report by parsing the actual text of the message. The URI can be classified as a locator, a name, or both, and it will be appreciated that the URL is a subset of the URI that, in addition to identifying the resource, also locates the resource. This process is performed so spam reports can be associated with the unique site or sites the spam is trying to advertise. Additional information may be parsed during this process, including the IP address of the sender and the Sender ID listed in the email which can be easily parsed from the headers of the email report.

Messages may also be sent to the listener via other electronic means, such as an XML web service or FTP and may not be the actual message received, but an electronic representation of the unsubscribe request and message details. For example, a button could be integrated with a specific email program (such as Outlook or Eudora) or through third party email programs such as Hotmail or Yahoo mail which may actually forward the spam report via an XML web service or as a simple email forward to a specific email address. This process may be performed real time as reports or made, or requests could be queued and sent on a batch basis.

The reporting of the messages may also be made by automatically forwarding spam emails 24a to the spam listener 14. In this scenario, an application installed with the user's email client automatically filters and determines spam based on key attributes of email messages. When spam is identified based on these attributes, the application automatically forwards a copy of the email to the spam listener, thus initiating the unsubscribe process without user intervention.

Accordingly, the spam listener can parse and compile spam reports according to any one or more of the following actions: (1) determining and storing unique advertised URIs; (2) determining and storing the initiating sender IP addresses; (3) determining and storing the sender ID of the email sender; and (4) determining and storing unique identifiers to identify the initiating party based on information sent in the spam report or electronic unsubscribe request.

Probe email addresses 40 can also be used in a system where actual user unsubscribe requests are not available or not preferred. In such a system, the trust of unsubscribe mechanisms in email can be tested to determine which parties are honoring unsubscribe requests and which parties are not. This information could then be used in determining the overall trust of senders and advertisers without actually processing requests for a specific user base. The listener process can be used to check the probes. Any email sent to the probes can be forwarded to the spam listener.

Figure 4:
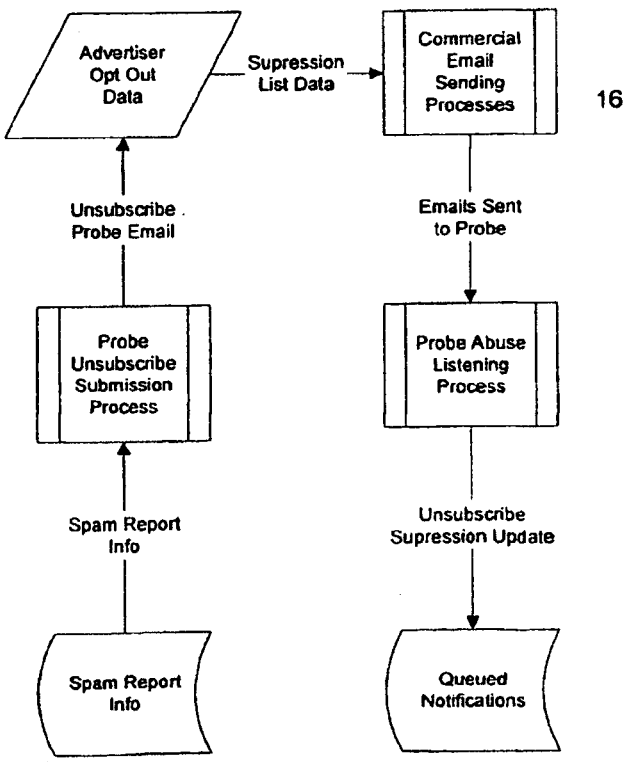
FIG. 4 illustrates a flow diagram of the unsubscribe probing process.

As illustrated in FIG. 4, the optional unsubscribe probing process 16 can be used to test the unsubscribe links in spam reports. While rare, some advertisers and email senders may abuse requests to unsubscribe by using the email address submitted and sending more email to it. The unsubscribe probing process is able to determine these instances by submitting a probe address, or fake email address, to the unsubscribe link advertised in email. The email address submitted to the unsubscribe link is unique to that link, sender or advertiser and the probing process then listens for email sent to this probe by checking the email account through POP3, MAPI or similar email retrieval process. If email is sent to the probe, outside of unsubscribe confirmations, this process can automatically suppress or otherwise limit unsubscribe requests for this unique link, advertiser or sender to prevent participant requests from being abused.

From the description of the spam listener process and unsubscribe probing process above, it will be appreciated that probe email accounts can be set up for collecting spam and forwarding the spam to the listener and/or for testing whether a specific unsubscribe link is abused. When setting up a probe email account for abuse testing, there is a one-to-one correlation of a unique probe email address to a unique unsubscribe link. In this way, the unique email address is submitted to the unique link and any unsolicited email sent to the probe after it is submitted to the specific link signifies abuse of the unsubscribe request. In comparison, the email accounts used for collecting spam may be useful to augment data from a subscriber base or can be used as the sole means of gathering spam reports and unsubscribe data when actual user spam reports are not desired. Therefore, there does not need to be any particular correlation between these collecting probes and unsubscribe links.

Figure 5:
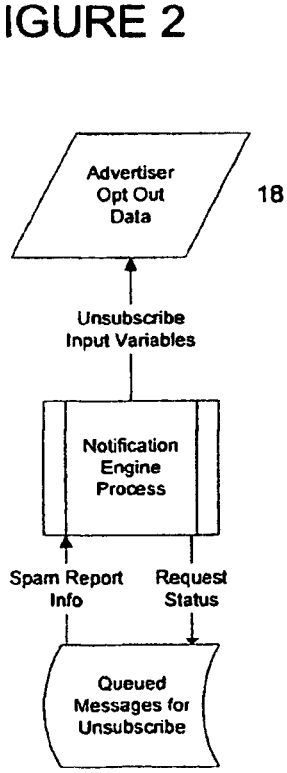
FIG. 5 illustrates a flow diagram of the notification engine process.

The function of the notification engine 18, as illustrated in FIG. 5, is to determine the unsubscribe mechanism for the spam report 30 and attempt to opt-out the reporting participant 22b, 22a from future solicitation. In the preferred embodiment, the notification engine or instances of the notification engine reside on the centralized server system. In another embodiment, the notification engine 18 can be installed locally on participant PCs 22b and responsible for processing an individual's own requests for unsubscribe. Generally, this process electronically retrieves the queued unsubscribe requests via an XML web service, direct network communication, or other electronic methods of retrieving data. The notification engine can work in cooperation with the spam listener 14 process to determine the unsubscribe mechanism for the corresponding spam reports.

The notification engine 18 retrieves queued requests 38 to unsubscribe from a centralized location through the centralized process and/or a client-based process. The centralized system processes requests for multiple parties in the system and electronically retrieves requests from a centralized location via XML, web or other electronic or network communication. The client-based system processes individual requests and electronically retrieves requests from a centralized location via XML, web or other electronic or network communication.

In parsing the received messages, key components are identified that relate to the unsubscribe mechanism. For example, each one of the following searches can be performed to determine the unsubscribe mechanism: (1) searching for an email address that accepts unsubscribe requests; (2) searching for key attributes indicative that a reply action to the initial sending email address is required for unsubscribe; (3) searching web pages listed in the spam report for an email address that accepts unsubscribe requests; (4) searching web pages listed in the spam report for key components that make up an unsubscribe request form; (5) searching web pages listed in the report for key components that make up an email subscription preferences page or sequence of pages; (6) searching for one-click unsubscribe links that do not require any variable input; and (7) searching for other mechanisms, including mechanisms embedded in the headers of email, or other third-party electronic unsubscribe and suppression mechanisms.

If an email address is provided in the spam message along with key indicators in the email, this may be assumed to be an opt-out mechanism. An email is then automatically sent to the email address listed in the message that comes from the email address from the queued notification with a subject of REMOVE, UNSUBSCRIBE or the like, which may be based on key attributes of the email. The process may look for keys to respond to the sent email with a remove request, which the notification engine will perform as indicated above.

In addition, each URL listed in the email is examined. The notification engine examines the corresponding web pages, searching for opt-out mechanisms. If an email address is posted on the web page along with key terms, then this is assumed to be an opt-out mechanism and an opt-out email is sent to the corresponding address. If certain HTML forms are provided on the site that may resemble an opt-out form, then the participant email address is submitted via the mechanism provided by the notification engine. This process is repeated for each queued notification. This same automated web crawling process can be used for determining complex unsubscribe processes that do not require input of an email address, but the setting of email preferences through a web site.

While currently known unsubscribe mechanisms are typically email-based or web-based, the scope of this process should not be limited to known unsubscribe mechanisms. It is reasonably expected that new types of unsubscribe mechanisms for electronic communication will be developed. These may include mechanisms embedded into the headers of email or other third-party methods for unsubscribe not yet developed. This process should not be limited to currently known mechanisms, and should include any mechanism used for the removal from electronic solicitation.

Accordingly, the notification engine 18 can automatically post unsubscribe requests according to any one or more of the following mechanisms: (1) sending an email on the behalf of the reporting email address to the email address determined in the mechanism search process and using a subject or body determined in the mechanism search process; (2) posting an email address to a web-based removal form as determined by the mechanism search process; (3) navigating an email preferences web page or sequence of web pages and performing actions as determined by the mechanism search process on behalf of the reporting user; (4) navigating to a specific hyperlink in the message, which completely handles the unsubscribe process without additional variable input; and (5) posting requests through any other electronic means as determined by any other mechanism search process.

As suggested above, the unsubscribe mechanism can be determined and stored by the spam listener and associated with the spam report as it is received. Preferably, a computer program automatically determines the unsubscribe function, although the function could also be determined manually. In this case, the notification engine would only have to follow the procedure for the specified mechanism and not be responsible for the actual determination of the unsubscribe mechanism.

In a similar embodiment, a service or application could allow users to see a list of the stored spam attributes. These attributes could include the email address of known spammers, the URLs of known products or advertisers, or other unique identifiers of spam. The user could then choose which advertisers or senders they want to post unsubscribe requests for based on this information. In this method, the notification engine posts the unsubscribe request and the centralized process determines the success of the request without having to receive an actual Spain report from the user.

In all cases, the success of the unsubscribe process by the notification engine may be logged to a centralized server for use in determining whether the advertiser is respecting the unsubscribe request. The notification engine preferably receives the unsubscribe status and records the success or failure of unsubscribe requests. The unsubscribe status can be updated via a web service, web, or other electronic communication, and can be recorded with relation to the unsubscribe party or email address, the unsubscribe method used, and the date and time of the request, as well as any other critical components of the request which may be used to identify compliance success or failure. The centralized server can then provide compiled reports on advertisers, spam senders and any other spam creators and whether they respect unsubscribe requests. This data may also be used by legal enforcement bodies, ISPs and others do determine the reputation of a particular advertiser or sender.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Additionally, it will be appreciated that the general concept of this system can be used for other types of unwanted electronic correspondence, not just traditional e-mail. The system could be used for any type of electronic communication where any entity wants an increased level of privacy, such as unsolicited mass mailings, unsolicited phone calls, and the like (such as, in the future, unsolicited HDTV advertisements or other broadcast, multicast or other communication in which communications are directed or otherwise targeted to users based on a user profile or other user demographics). Although the particular implementation of the privacy system may differ depending on the realm of the communication (computer, telephony, mobile, instant messaging), it will be appreciated that the present embodiment for a spam email system can be used for any type of communication system that can be computer-controlled. For example, as communication paths converge and merge (convergence of digital communications), including automated computer control systems that govern routing systems for the physical mail, the present invention can be embodied in a generic privacy system for any one or more of these types of computer-controlled communication systems. Thus, the breadth and scope of the present invention should not be limited by any of the above-described exemplary embodiments, but should be defined only in accordance with the following claims appended hereto and their equivalents.

What is claimed is:

1. A method for providing privacy control in a communication system;
    receiving at a centralized processor a set of spam notices from a set of participants;
    identifying a set of advertisers from said set of spam notices, wherein said identifying step is comprised of parsing said spam notices at said centralized processor;
    determining at said centralized processor a set of unsubscribe mechanisms corresponding with said set of advertisers, wherein said determining step is comprised of automatically parsing and identifying key attributes associated with an unsubscribe function, and wherein said parsing and identifying further comprise the searching step selected from the group of steps consisting of: searching for an email address in said spam notices; searching for a reply action key attribute; searching for an email address in web pages listed in said spam notices; searching for request form key components in web pages listed in said spam report; searching for email subscription key components in web pages listed in said spam report; and searching for a one-click unsubscribe link; and
    sending from said centralized processor a set of unsubscribe requests to said set of advertisers according to said corresponding set of unsubscribe mechanisms.

2. A method for providing privacy control in a communication system;
    receiving at a centralized processor a set of spam notices from a set of participants, wherein the set of spam notices relates to unwanted email filtered by the participant;
    parsing said set of spam notices at said centralized processor;
    identifying at said centralized processor a set of advertisers from said set of spam notices;
    determining at said centralized processor a set of unsubscribe mechanisms corresponding with said set of advertisers, wherein said parsing, identifying and determining steps further comprise automatically parsing and identifying key attributes associated with an unsubscribe function, and a searching step selected from the group of steps consisting of: searching for an email address in said unwanted email messages; searching for a reply action key attribute; searching for an email address in web pages listed in said unwanted email messages; searching for request form key components in web pages listed in said unwanted email messages; searching for email subscription key components in web pages listed in said unwanted email messages; and searching for a one-click unsubscribe link;

creating a set of probe accounts; and sending from said centralized processor a set of unsubscribe requests to said set of advertisers according to said corresponding set of unsubscribe mechanisms and a set of unique unsubscribe requests corresponding with said set of probe accounts.

3. A method for providing privacy control in a communication system;

receiving at a centralized processor unwanted email filtered by a participant;

parsing said unwanted email at said centralized processor;

identifying at said centralized Processor a set of advertisers from said unwanted email independent of any email client used by said participant;

determining at said centralized processor a set of unsubscribe mechanisms corresponding with said set of advertisers, wherein said parsing, identifying and determining steps further comprise automatically parsing and identifying key attributes associated with an unsubscribe function, and a searching step selected from the group of steps consisting of: searching for an email address in said unwanted email messages; searching for a reply action key attribute; searching for an email address in web pages listed in said unwanted email messages; searching for request form key components in web pages listed in said unwanted email messages; searching for email subscription key components in web pages listed in said unwanted email messages; and searching for a one-click unsubscribe link;

creating at said centralized processor a spam report relating said set of advertisers with said unwanted email and said set of unsubscribe mechanisms;

sending from said centralized processor a set of unsubscribe requests to said set of advertisers according to said corresponding set of unsubscribe mechanisms to unsubscribe said participant from future unwanted email sent by said set of advertisers; and recording a set of unsubscribe status results corresponding with said set of unsubscribe requests.

4. A method for unsubscribe processing in a communication system;

forwarding unwanted email messages to a centralized processor;

parsing said unwanted email messages at said centralized processor;

identifying at the centralized processor advertisers associated with the unwanted email message;

determining at the centralized processor a set of unsubscribe mechanisms corresponding with each advertiser, wherein said parsing, identifying and determining steps further comprise automatically parsing and identifying key attributes associated with an unsubscribe function, and a searching step selected from the group of steps consisting of: searching for an email address in said unwanted email messages; searching for a reply action key attribute; searching for an email address in web pages listed in said unwanted email messages; searching for request form key components in web pages listed in said unwanted email messages; searching for email subscription key components in web pages listed in said unwanted email messages; and searching for a one-click unsubscribe link; and sending from the centralized processor a set of unsubscribe requests to each advertiser according to the corresponding set of unsubscribe mechanisms to unsubscribe a user from future unwanted email messages sent by said advertisers.

5. The method of claim 4, further comprising the step of creating a spam report relating said advertisers with said set of unwanted email message and said set of unsubscribe mechanisms.

6. The method of claim 4 further comprising the steps of registering a set of subscribers and creating a set of probe accounts.

* * * * *

UNITED STATES PATENT AND TRADEMARK OFFICE
CERTIFICATE OF CORRECTION

PATENT NO. : 7,620,690 B1  
APPLICATION NO. : 10/972531  
DATED : November 17, 2009  
INVENTOR(S) : Castelli Page 1 of 10

It is certified that error appears in the above-identified patent and that said Letters Patent is hereby corrected as shown below:

Delete patent 7,620,690 in its entirety and insert patent 7,620,690 in its entirety as attached.

Signed and Sealed this

Seventh Day of February, 2012

David J. Kappos
*Director of the United States Patent and Trademark Office*

(12) United States Patent
Castelli

(10) Patent No.: US 7,620,690 B1
(45) Date of Patent: Nov. 17, 2009

(54) PRIVACY CONTROL SYSTEM FOR ELECTRONIC COMMUNICATION

(75) Inventor: Eric L. Castelli, St. Louis, MO (US)

(73) Assignee: Lashback, LLC, Millstadt, IL (US)

( * ) Notice: Subject to any disclaimer, the term of this patent is extended or adjusted under 35 U.S.C. 154(b) by 871 days.

(21) Appl. No.: 10/972,531

(22) Filed: Oct. 25, 2004

Related U.S. Application Data

(60) Provisional application No. 60/523,597, filed on Nov. 20, 2003, provisional application No. 60/536,488, filed on Jan. 14, 2004.

(51) Int. Cl.
*G06F 15/16* (2006.01)
(52) U.S. Cl. .................. 709/206; 709/207
(58) Field of Classification Search .......... 709/204, 709/206, 207
See application file for complete search history.

(56) References Cited

U.S. PATENT DOCUMENTS

| | | | |
|---|---|---|---|
| 5,999,932 A | 12/1999 | Paul | |
| 6,023,723 A | 2/2000 | McCormick et al. | |
| 6,052,709 A | 4/2000 | Paul | |
| 6,092,101 A | 7/2000 | Birrell et al. | |
| 6,167,434 A * | 12/2000 | Pang | 709/206 |
| 6,249,805 B1 | 6/2001 | Fleming, III | |
| 6,266,692 B1 | 7/2001 | Greenstein | |
| 6,321,267 B1 | 11/2001 | Donaldson | |
| 6,324,569 B1 | 11/2001 | Ogilvie et al. | |
| 6,330,590 B1 | 12/2001 | Cotten | |
| 6,393,465 B2 | 5/2002 | Leeds | |
| 6,400,810 B1 | 6/2002 | Skladman et al. | |
| 6,421,709 B1 | 7/2002 | McCormick et al. | |
| 6,453,327 B1 | 9/2002 | Nielsen | |
| 6,484,197 B1 | 11/2002 | Donohue | |
| 6,487,586 B2 | 11/2002 | Ogilvie et al. | |
| 6,493,007 B1 * | 12/2002 | Pang | 715/835 |
| 6,546,416 B1 | 4/2003 | Kirsch | |
| 6,615,242 B1 | 9/2003 | Riemers | |
| 7,092,992 B1 * | 8/2006 | Yu | 709/206 |
| 2002/0016824 A1 | 2/2002 | Leeds | |
| 2002/0026487 A1 | 2/2002 | Ogilvie et al. | |
| 2002/0059385 A1 | 5/2002 | Lin | |
| 2002/0116463 A1 | 8/2002 | Hart | |
| 2002/0120748 A1 | 8/2002 | Schiavone et al. | |
| 2002/0129111 A1 | 9/2002 | Cooper | |
| 2002/0162025 A1 | 10/2002 | Sutton et al. | |
| 2002/0174185 A1 * | 11/2002 | Rawat et al. | 709/206 |
| 2002/0181703 A1 | 12/2002 | Logan et al. | |
| 2002/0198950 A1 | 12/2002 | Leeds | |
| 2003/0023692 A1 | 1/2003 | Moroo | |
| 2003/0041126 A1 | 2/2003 | Buford et al. | |
| 2003/0050988 A1 | 3/2003 | Kucherawy | |
| 2003/0088627 A1 | 5/2003 | Rothwell et al. | |
| 2003/0131063 A1 | 7/2003 | Breck | |

(Continued)

*Primary Examiner*—Jeffrey Pwu
*Assistant Examiner*—Gerald Smarth
(74) *Attorney, Agent, or Firm*—Dennis J. M. Donahue, III; Husch Blackwell Sanders LLP

(57) ABSTRACT

A privacy control system provides a centralized process for managing unsubscribe requests to unsolicited communications. The system receives reports of unsolicited communications, determines and follows the corresponding unsubscribe processes, and tracks the success of unsubscribe requests. The system can unsubscribe an individual or group of individuals through the centralized process, recording and monitoring the success of the request, independent of the email client used by the individuals.

21 Claims, 2 Drawing Sheets

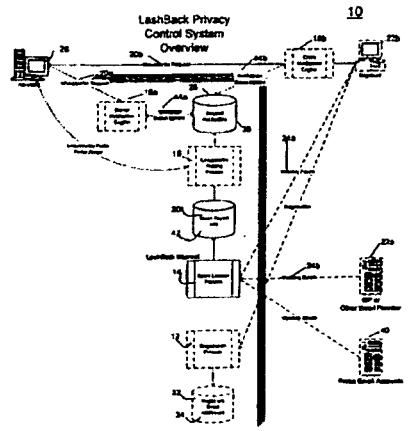

US 7,620,690 B1
Page 2

U.S. PATENT DOCUMENTS

| | | | |
|---|---|---|---|
| 2003/0132972 A1* | 7/2003 | Pang | 345/835 |
| 2003/0149726 A1 | 8/2003 | Spear | |
| 2003/0158777 A1* | 8/2003 | Schiff et al. | 705/14 |
| 2003/0158905 A1 | 8/2003 | Petry et al. | |
| 2003/0163540 A1 | 8/2003 | Dorricott | |
| 2003/0167311 A1 | 9/2003 | Kirsch | |
| 2003/0172294 A1* | 9/2003 | Judge | 713/200 |
| 2003/0187942 A1* | 10/2003 | Quine et al. | 709/207 |
| 2003/0191969 A1 | 10/2003 | Katsikas | |
| 2003/0195933 A1 | 10/2003 | Curren et al. | |
| 2003/0196116 A1 | 10/2003 | Troutman | |
| 2006/0031303 A1* | 2/2006 | Pang | 709/206 |

\* cited by examiner

PRIVACY CONTROL SYSTEM FOR ELECTRONIC COMMUNICATION

CROSS-REFERENCE TO RELATED APPLICATIONS

This application claims the benefit of U.S. Provisional Application Ser. Nos. 60/523,597, filed Nov. 20, 2003 and 60/536,488, filed Jan. 14, 2004.

BACKGROUND OF THE INVENTION

1. Field of the Invention

This invention relates generally to privacy controls for electronic communication systems and, more particularly, systems and methods for posting unsubscribe requests from electronic communication through a centralized process and monitoring the success of this process.

2. Related Art

Spam has become an increasingly large problem on the Internet. On a daily basis, billions of unsolicited advertisements are received by millions of individuals. The low cost of email makes it a great mechanism for advertisers to reach a large audience of potential customers. Unfortunately, in many cases, unsolicited emails simply act as an annoyance to Internet users and do nothing but cause frustration and slow productivity. Due to the increasing volume of spam and user's frustration and annoyance, several different techniques to reduce spam volume have been attempted.

Spam filters are one of the most common mechanisms of reducing spam volume. However, the problem with spam filters is spammers easily figure out ways to trick the filters and get their mail through. While spam filters are constantly getting smarter, so too are spammers. In addition, spam filters often require configuration by ISPs, customers or network specialists which becomes too cumbersome for most individuals. Also, spam filters will often block legitimate email, creating additional problems for users.

Many states have laws which restrict how unsolicited advertisements can be delivered. Many of these laws simply enforce that spammers use a valid email address, email does not contain a misleading subject, and that email advertisers provide a means for allowing recipients to opt-out or otherwise unsubscribe. Unfortunately, these laws are difficult to enforce due to the lack of violation tracking mechanisms and the difficulty tracking down violators.

There are numerous bills proposed on the Federal level which propose tightening the ropes on what email advertisers can do. However, these attempts will likely face tough battles, as advertisers will lobby hard to prevent such measures, such as with the proposed Federal Do Not Call List. In addition, the Federal Government also has very little means to enforce such laws and would be limited in prohibiting spam from International parties.

Another mechanism for reducing spam requires a user to perform one of the many types of unsubscribe processes that spammers may use. Advertisers who provide an unsubscribe mechanism generally comply with unsubscribe requests. However, unscrupulous spammers may not comply with any request and will only stop after being ordered by a court. Additionally, even when the users follow the unsubscribe mechanisms, they usually have specific requirements that differ only slightly, but since the unsubscribe processes are usually automated, an error in following the particular requirements usually results in a failed unsubscribe request. Accordingly, a user may use the unsubscribe mechanism to avoid spam from a particular source but may continue to receive spam from this source.

Some have proposed offering programs that tie into the email client that provides the option of automatically deleting spam and unsubscribing from the source. However, a process that is dependant on the email client does not provide a universal solution for email users, since there are hundreds of email clients in use today and more will continue to develop as email evolves to new realms. In addition, it does not provide a centralized mechanism for determining advertisers and email senders that persistently fail to comply with requests to unsubscribe from electronic communication. Therefore, it would be beneficial to have a centralized system that can assist users with unsubscribing from electronic communication and monitor of unsubscribe requests by multiple users.

SUMMARY OF THE INVENTION

It is in view of the above problems and limitations in known privacy control systems that the present invention was developed. The present invention provides a centralized system that manages and tracks the unsubscribe requests for individuals or groups of individuals wishing to unsubscribe from future electronic solicitations that is independent of the email client that these individuals are using.

The present invention provides a single source for receiving spam reports and requests to unsubscribe from electronic communication and a process for automatically performing unsubscribe actions and monitoring the outcome. Accordingly, subscribers to the protection side of the system shall benefit from a reduction of unsolicited correspondence as well as other types of communication, if not a complete elimination without specific software requirements.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 1 illustrates a process overview of the privacy control system for electronic communication according to the present invention;

FIG. 2 illustrates a flow diagram of the registration process;

FIG. 3 illustrates a flow diagram of the spam listener process;

FIG. 4 illustrates a flow diagram of the unsubscribe probing process; and

FIG. 5 illustrates a flow diagram of the notification engine process.

DETAILED DESCRIPTION OF THE PREFERRED EMBODIMENTS

Referring to the accompanying drawings in which like reference numbers indicate like elements, FIG. 1 illustrates a privacy control system 10 for electronic communication. The privacy control system 10, known as LASHBACK™, preferably has four basic components: the participant registration process 12, the spam listener process 14, the unsubscribe probing process 16 and the notification engine process 18a, 18b. Brief descriptions of these processes are discussed below with reference to FIG. 1, followed by a detailed description of each module. Generally, the system 10 manages and tracks the unsubscribe requests 20a, 20b for participants 22a, 22b, who may or may not be registered, independent from the email clients that are being used by the participants. In particular, the privacy control system 10 receives spam notices 24a, 24b from the participants, identifies advertisers 26 from the spam notices 24a, 24b, determines unsubscribe mechanisms 28 corresponding with the advertisers 26, and sends the unsubscribe requests 20a, 20b to the advertisers 26 according to the unsubscribe mechanisms 28.

In the preferred embodiment, privacy control is provided in a centralized system 10 for processing the unsubscribe requests 20a, 20b from electronic communication and recording the status 44a, 44b of the requests. In this way, the centralized privacy control system 10 provides a single source for users of electronic communication to unsubscribe from future solicitation that does not require software to be installed on the client 22. In addition, it provides a mechanism for compiling spam report information 30 about which senders and advertisers comply and which ones fail to comply with these requests. This data can then be used in establishing a reputation for these senders and advertisers.

For participant registration 12, a web site allows participants to register. When a participant signs up to use the system, the participant provides basic information, including the email address or email addresses 32 for which unsubscribe requests are to be processed. A secure database records and stores participant information 34 as a subscriber set 36. Each subscriber is provided with a login account to allow them to change their information or disable participation from the service at a later point. In the preferred embodiment, the database stores the addresses of multiple subscribers as a subscriber set, and it will be appreciated that, under general set theory as used herein, the subscriber set may include a single subscriber.

It will also be appreciated that, although email addresses 32 are being stored in an address field for the preferred embodiment, the addresses could be any identification scheme for the subscribers, such as a postal address in a privacy control system for physical mail, a phone number or other user identification code for telephony, a device address (such as IRD, MAC, or subscriber ID) in a privacy control system for broadcast or multicast receivers, &/or any other equivalent schemes. Accordingly, as used herein, spam is a general reference to unsolicited bulk communications.

The spam listener 14 process allows participants to report spammer violations and queue an unsubscribe request 38 for that email. When a subscriber receives an unsolicited email, they simply forward the violation to a specified email address that receives the report for the spam listener. As discussed in detail below, a set of probe email addresses 40 may also be used to automatically forward reported spam to the spam listener 14. The spam listener records the alleged violations in a secure database 42 and tallies the alleged violations. Each email sent to the spam listener is parsed and violations can be tallied and reported in the spam reports 30 by any information in the reported email 24a, 24b, including the spammer's email address, email header information and URLs listed in the email, as well as IP addresses and related sender ID information contained within the message.

The unsubscribe probing process 16 can be employed on spam reports that come in to determine parties that abuse unsubscribe requests. Unsubscribe abuse is when an email address is posted to an unsubscribe mechanism and added to future mailing lists by the recipient of the request. Thus, rather than suppressing the email address from future email, more email is sent to the address. This process is able to probe each unsubscribe mechanism and determine which are abused, thereby suppressing unsubscribe requests for users from being made to these mechanisms.

The notification engine 18a, 18b is a program that takes the unique emails sent to the listener and parses the email in search of an opt-out mechanism 28. If an opt-out email address, form, or other mechanism is found in the violating email or on the web pages referenced in the email, then an opt-out request can be submitted for each user through the mechanism provided by the advertiser. A downloadable version on the notification engine 18b may be offered to subscribers or the notification engine 18a can run on the preferred centralized system 10 which may include one or more servers. If a subscriber 22b runs the notification engine from their PC, violators can be notified more quickly. Accordingly, the opt-out requests can be submitted by the central server, by the individual users' computers or by a combination of both the server and the computers. In all cases, the success 44 of the request can then be stored and recorded, providing the data that supports which advertisers and senders abide by unsubscribe requests and which fail to do so.

The optional participant registration process 12, as illustrated in FIG. 2, is preferably performed through a public web site. When an individual wants to sign up for the service, they go to the web site and enter their email address, a secure password and other participant information. Once the user submits the request, the participant's information is stored in a database and they are officially registered for the service.

As illustrated in FIG. 3, the spam listener process 14 retrieves each reported spam message from this email address through POP3, MAPI or similar email retrieval process. The spam listener 14 parses the reported spam and compiles the information as a spam report 30. Participants preferably forward spam messages 24a or requests to unsubscribe to a designated email address, and the spam listener parses out the individual who reported the spam. If the individual who reported the spam is not a registered participant, the email addresses of the sender may be determined based on the headers of the email or other components of the request. The spam sender's email address and the email send date, as determined by the email headers, may be used to uniquely identify the spam report and the report is recorded in a database 42 and associated with the reporting email address.

Each Uniform Resource Indicator (URI) for each hyperlink in the reported message is determined, logged and associated with the spam report by parsing the actual text of the message. The URI can be classified as a locator, a name, or both, and it will be appreciated that the URL is a subset of the URI that, in addition to identifying the resource, also locates the resource. This process is performed so spam reports can be associated with the unique site or sites the spam is trying to advertise. Additional information may be parsed during this process, including the IP address of the sender and the Sender ID listed in the email which can be easily parsed from the headers of the email report.

Messages may also be sent to the listener via other electronic means, such as an XML web service or FTP and may not be the actual message received, but an electronic representation of the unsubscribe request and message details. For example, a button could be integrated with a specific email program (such as Outlook or Eudora) or through third party email programs such as Hotmail or Yahoo mail which may actually forward the spam report via an XML web service or as a simple email forward to a specific email address. This process may be performed real time as reports or made, or requests could be queued and sent on a batch basis.

The reporting of the messages may also be made by automatically forwarding spam emails 24a to the spam listener 14. In this scenario, an application installed with the user's email client automatically filters and determines spam based on key attributes of email messages. When spam is identified based on these attributes, the application automatically forwards a copy of the email to the spam listener, thus initiating the unsubscribe process without user intervention.

Accordingly, the spam listener can parse and compile spam reports according to any one or more of the following actions: (1) determining and storing unique advertised URLs; (2) determining and storing the initiating sender IP addresses; (3) determining and storing the sender ID of the email sender; and (4) determining and storing unique identifiers to identify the initiating party based on information sent in the spam report or electronic unsubscribe request.

Probe email addresses 40 can also be used in a system where actual user unsubscribe requests are not available or not preferred. In such a system, the trust of unsubscribe mechanisms in email can be tested to determine which parties are honoring unsubscribe requests and which parties are not. This information could then be used in determining the overall trust of senders and advertisers without actually processing requests for a specific user base. The listener process can be used to check the probes. Any email sent to the probes can be forwarded to the spam listener.

As illustrated in FIG. 4, the optional unsubscribe probing process 16 can be used to test the unsubscribe links in spam reports. While rare, some advertisers and email senders may abuse requests to unsubscribe by using the email address submitted and sending more email to it. The unsubscribe probing process is able to determine these instances by submitting a probe address, or fake email address, to the unsubscribe link advertised in email. The email address submitted to the unsubscribe link is unique to that link, sender or advertiser and the probing process then listens for email sent to this probe by checking the email account through POP3, MAPI or similar email retrieval process. If email is sent to the probe, outside of unsubscribe confirmations, this process can automatically suppress or otherwise limit unsubscribe requests for this unique link, advertiser or sender to prevent participant requests from being abused.

From the description of the spam listener process and unsubscribe probing process above, it will be appreciated that probe email accounts can be set up for collecting spam and forwarding the spam to the listener and/or for testing whether a specific unsubscribe link is abused. When setting up a probe email account for abuse testing, there is a one-to-one correlation of a unique probe email address to a unique unsubscribe link. In this way, the unique email address is submitted to the unique link and any unsolicited email sent to the probe after it is submitted to the specific link signifies abuse of the unsubscribe request. In comparison, the email accounts used for collecting spam may be useful to augment data from a subscriber base or can be used as the sole means of gathering spam reports and unsubscribe data when actual user spam reports are not desired. Therefore, there does not need to be any particular correlation between these collecting probes and unsubscribe links.

The function of the notification engine 18, as illustrated in FIG. 5, is to determine the unsubscribe mechanism for the spam report 30 and attempt to opt-out the reporting participant 22b, 22a from future solicitation. In the preferred embodiment, the notification engine or instances of the notification engine reside on the centralized server system. In another embodiment, the notification engine 18 can be installed locally on participant PCs 22b and responsible for processing an individual's own requests for unsubscribe. Generally, this process electronically retrieves the queued unsubscribe requests via an XML web service, direct network communication, or other electronic methods of retrieving data. The notification engine can work in cooperation with the spam listener 14 process to determine the unsubscribe mechanism for the corresponding spam reports.

The notification engine 18 retrieves queued requests 38 to unsubscribe from a centralized location through the centralized process and/or a client-based process. The centralized system processes requests for multiple parties in the system and electronically retrieves requests from a centralized location via XML, web or other electronic or network communication. The client-based system processes individual requests and electronically retrieves requests from a centralized location via XML, web or other electronic or network communication.

In parsing the received messages, key components are identified that relate to the unsubscribe mechanism. For example, each one of the following searches can be performed to determine the unsubscribe mechanism: (1) searching for an email address that accepts unsubscribe requests; (2) searching for key attributes indicative that a reply action to the initial sending email address is required for unsubscribe; (3) searching web pages listed in the spam report for an email address that accepts unsubscribe requests; (4) searching web pages listed in the spam report for key components that make up an unsubscribe request form; (5) searching web pages listed in the report for key components that make up an email subscription preferences page or sequence of pages; (6) searching for one-click unsubscribe links that do not require any variable input; and (7) searching for other mechanisms, including mechanisms embedded in the headers of email, or other third-party electronic unsubscribe and suppression mechanisms.

If an email address is provided in the spam message along with key indicators in the email, this may be assumed to be an opt-out mechanism. An email is then automatically sent to the email address listed in the message that comes from the email address from the queued notification with a subject of REMOVE, UNSUBSCRIBE or the like, which may be based on key attributes of the email. The process may look for keys to respond to the sent email with a remove request, which the notification engine will perform as indicated above.

In addition, each URL listed in the email is examined. The notification engine examines the corresponding web pages, searching for opt-out mechanisms. If an email address is posted on the web page along with key terms, then this is assumed to be an opt-out mechanism and an opt-out email is sent to the corresponding address. If certain HTML forms are provided on the site that may resemble an opt-out form, then the participant email address is submitted via the mechanism provided by the notification engine. This process is repeated for each queued notification. This same automated web crawling process can be used for determining complex unsubscribe processes that do not require input of an email address, but the setting of email preferences through a web site.

While currently known unsubscribe mechanisms are typically email-based or web-based, the scope of this process should not be limited to known unsubscribe mechanisms. It is reasonably expected that new types of unsubscribe mechanisms for electronic communication will be developed. These may include mechanisms embedded into the headers of email or other third-party methods for unsubscribe not yet developed. This process should not be limited to currently known mechanisms, and should include any mechanism used for the removal from electronic solicitation.

Accordingly, the notification engine 18 can automatically post unsubscribe requests according to any one or more of the following mechanisms: (1) sending an email on the behalf of the reporting email address to the email address determined in the mechanism search process and using a subject or body determined in the mechanism search process; (2) posting an email address to a web-based removal form as determined by the mechanism search process; (3) navigating an email preferences web page or sequence of web pages and performing actions as determined by the mechanism search process on behalf of the reporting user; (4) navigating to a specific hyperlink in the message, which completely handles the unsubscribe process without additional variable input; and (5) posting requests through any other electronic means as determined by any other mechanism search process.

As suggested above, the unsubscribe mechanism can be determined and stored by the spam listener and associated with the spam report as it is received. Preferably, a computer program automatically determines the unsubscribe function, although the function could also be determined manually. In this case, the notification engine would only have to follow the procedure for the specified mechanism and not be responsible for the actual determination of the unsubscribe mechanism.

In a similar embodiment, a service or application could allow users to see a list of the stored spam attributes. These attributes could include the email address of known spammers, the URLs of known products or advertisers, or other unique identifiers of spam. The user could then choose which advertisers or senders they want to post unsubscribe requests for based on this information. In this method, the notification engine posts the unsubscribe request and the centralized process determines the success of the request without having to receive an actual Spain report from the user.

In all cases, the success of the unsubscribe process by the notification engine may be logged to a centralized server for use in determining whether the advertiser is respecting the unsubscribe request. The notification engine preferably receives the unsubscribe status and records the success or failure of unsubscribe requests. The unsubscribe status can be updated via a web service, web, or other electronic communication, and can be recorded with relation to the unsubscribe party or email address, the unsubscribe method used, and the date and time of the request, as well as any other critical components of the request which may be used to identify compliance success or failure. The centralized server can then provide compiled reports on advertisers, spam senders and any other spam creators and whether they respect unsubscribe requests. This data may also be used by legal enforcement bodies, ISPs and others do determine the reputation of a particular advertiser or sender.

In view of the foregoing, it will be seen that the several advantages of the invention are achieved and attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Additionally, it will be appreciated that the general concept of this system can be used for other types of unwanted electronic correspondence, not just traditional e-mail. The system could be used for any type of electronic communication where any entity wants an increased level of privacy, such as unsolicited mass mailings, unsolicited phone calls, and the like (such as, in the future, unsolicited HDTV advertisements or other broadcast, multicast or other communication in which communications are directed or otherwise targeted to users based on a user profile or other user demographics). Although the particular implementation of the privacy system may differ depending on the realm of the communication (computer, telephony, mobile, instant messaging), it will be appreciated that the present embodiment for a spam email system can be used for any type of communication system that can be computer-controlled. For example, as communication paths converge and merge (convergence of digital communications), including automated computer control systems that govern routing systems for the physical mail, the present invention can be embodied in a generic privacy system for any one or more of these types of computer-controlled communication systems. Thus, the breadth and scope of the present invention should not be limited by any of the above-described exemplary embodiments, but should be defined only in accordance with the following claims appended hereto and their equivalents.

What is claimed is:

1. A method for providing privacy control in a communication system;
receiving at a centralized processor a set of spam notices from a set of participants;
identifying a set of advertisers from said set of spam notices, wherein said identifying step is comprised of parsing said spam notices at said centralized processor;
determining at said centralized processor a set of unsubscribe mechanisms corresponding with said set of advertisers, wherein said determining step is comprised of automatically parsing and identifying key attributes associated with an unsubscribe function, and wherein said parsing and identifying further comprise the searching step selected from the group of steps consisting of: searching for an email address in said spam notices; searching for a reply action key attribute; searching for an email address in web pages listed in said spam notices; searching for request form key components in web pages listed in said spam report; searching for email subscription key components in web pages listed in said spam report; and searching for a one-click unsubscribe link; and
sending from said centralized processor a set of unsubscribe requests to said set of advertisers according to said corresponding set of unsubscribe mechanisms.

2. A method for providing privacy control in a communication system;
receiving at a centralized processor a set of spam notices from a set of participants, wherein the set of spam notices relates to unwanted email filtered by the participant;
parsing said set of spam notices at said centralized processor;
identifying at said centralized processor a set of advertisers from said set of spam notices;
determining at said centralized processor a set of unsubscribe mechanisms corresponding with said set of advertisers, wherein said parsing, identifying and determining steps further comprise automatically parsing and identifying key attributes associated with an unsubscribe function, and a searching step selected from the group of steps consisting of: searching for an email address in said unwanted email messages; searching for a reply action key attribute; searching for an email address in web pages listed in said unwanted email messages; searching for request form key components in web pages listed in said unwanted email messages; searching for email subscription key components in web pages listed in said unwanted email messages; and searching for a one-click unsubscribe link;

creating a set of probe accounts; and sending from said centralized processor a set of unsubscribe requests to said set of advertisers according to said corresponding set of unsubscribe mechanisms and a set of unique unsubscribe requests corresponding with said set of probe accounts.

3. A method for providing privacy control in a communication system;

receiving at a centralized processor unwanted email filtered by a participant;

parsing said unwanted email at said centralized processor;

identifying at said centralized Processor a set of advertisers from said unwanted email independent of any email client used by said participant;

determining at said centralized processor a set of unsubscribe mechanisms corresponding with said set of advertisers, wherein said parsing, identifying and determining steps further comprise automatically parsing and identifying key attributes associated with an unsubscribe function, and a searching step selected from the group of steps consisting of: searching for an email address in said unwanted email messages; searching for a reply action key attribute; searching for an email address in web pages listed in said unwanted email messages; searching for request form key components in web pages listed in said unwanted email messages; searching for email subscription key components in web pages listed in said unwanted email messages; and searching for a one-click unsubscribe link;

creating at said centralized processor a spam report relating said set of advertisers with said unwanted email and said set of unsubscribe mechanisms;

sending from said centralized processor a set of unsubscribe requests to said set of advertisers according to said corresponding set of unsubscribe mechanisms to unsubscribe said participant from future unwanted email sent by said set of advertisers; and recording a set of unsubscribe status results corresponding with said set of unsubscribe requests.

4. A method for unsubscribe processing in a communication system;

forwarding unwanted email messages to a centralized processor;

parsing said unwanted email messages at said centralized processor;

identifying at the centralized processor advertisers associated with the unwanted email message;

determining at the centralized processor a set of unsubscribe mechanisms corresponding with each advertiser, wherein said parsing, identifying and determining steps further comprise automatically parsing and identifying key attributes associated with an unsubscribe function, and a searching step selected from the group of steps consisting of: searching for an email address in said unwanted email messages; searching for a reply action key attribute; searching for an email address in web pages listed in said unwanted email messages; searching for request form key components in web pages listed in said unwanted email messages; searching for email subscription key components in web pages listed in said unwanted email messages; and searching for a one-click unsubscribe link; and sending from the centralized processor a set of unsubscribe requests to each advertiser according to the corresponding set of unsubscribe mechanisms to unsubscribe a user from future unwanted email messages sent by said advertisers.

5. The method of claim 4, further comprising the step of creating a spam report relating said advertisers with said set of unwanted email message and said set of unsubscribe mechanisms.

6. The method of claim 4 further comprising the steps of registering a set of subscribers and creating a set of probe accounts.

7. The method of claim 1 further comprising the step of tallying alleged violations of said unsubscribe requests at said centralized processor.

8. The method of claim 1 wherein said identifying step is independent of any email client used by said set of participants.

9. The method of claim 1 wherein said determining step is comprised of manually determining an unsubscribe function and providing a corresponding unsubscribe procedure.

10. The method of claim 1 further comprising the step of recording a set of unsubscribe status results corresponding with said set of unsubscribe requests, wherein said unsubscribe mechanisms process said unsubscribe requests and unsubscribe said set of participants from future spam sent by said set of advertisers.

11. The method of claim 1 further comprising the step of creating a spam report relating said set of advertisers with said set of spam notices and said set of unsubscribe mechanisms.

12. The method of claim 1 further comprising the step of registering a set of subscribers from said set of participants.

13. The method of claim 1 further comprising the step of creating a set of probe accounts.

14. The method of claim 13 further comprising the steps of submitting a unique probe address according to a corresponding unsubscribe mechanism and checking for any email sent to said unique probe address.

15. The method of claim 2 further comprising the step of checking for any email sent to said set of probe accounts.

16. The method of claim 2 further comprising the step of recording a set of unsubscribe status results corresponding with said set of unsubscribe requests.

17. The method of claim 2 further comprising the step of creating a spam report relating said set of advertisers with said set of spam notices and said set of unsubscribe mechanisms.

18. The method of claim 2 further comprising the step of registering a set of subscribers from said set of participants.

19. The method of claim 3 further comprising the step of creating a set of probe accounts.

20. The method of claim 19 further comprising the steps of submitting a unique probe address according to a corresponding unsubscribe mechanism and checking for any email sent to said unique probe address.

21. The method of claim 3 further comprising the step of registering a set of subscribers from said set of participants.

* * * * *